US011859933B1

(12) United States Patent
Kordana et al.

(10) Patent No.: US 11,859,933 B1
(45) **Date of Patent: *Jan. 2, 2024**

(54) REMOVABLE BEARING SYSTEM FOR A GUNNER STAND

(71) Applicant: Lenco Industries, Inc., Pittsfield, MA (US)

(72) Inventors: Jake L. Kordana, Windsor, MA (US); Brian F. Sears, Dalton, MA (US)

(73) Assignee: Lenco Industries, Inc., Pittsfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,733

(22) Filed: Dec. 16, 2022

Related U.S. Application Data

(63) Continuation of application No. 17/839,916, filed on Jun. 14, 2022, now Pat. No. 11,561,060.

(51) Int. Cl.

| | |
|---|---|
| ***B66F 7/28*** | (2006.01) |
| ***F41A 23/24*** | (2006.01) |
| ***F41A 27/08*** | (2006.01) |
| ***B66F 11/04*** | (2006.01) |
| ***B66F 17/00*** | (2006.01) |
| *B66F 7/06* | (2006.01) |

(52) U.S. Cl.
CPC ................ *F41A 23/24* (2013.01); *B66F 7/28* (2013.01); *B66F 17/006* (2013.01); *F41A 27/08* (2013.01); *B66F 7/0608* (2013.01); *B66F 11/042* (2013.01)

(58) Field of Classification Search
CPC ........ B66F 7/28; B66F 7/0666; B66F 17/006; B66F 7/0608; B66F 11/042; F41A 23/24; F41A 27/08
See application file for complete search history.

(56) References Cited

U.S. PATENT DOCUMENTS

| | | | | |
|---|---|---|---|---|
| 7,083,243 B2 * | 8/2006 | Lee | ...................... | A47B 88/467 312/334.47 |
| 11,561,060 B1 * | 1/2023 | Kordana | ................. | F41A 23/24 |
| 2017/0030092 A1 * | 2/2017 | Young | .................... | F16M 11/38 |

FOREIGN PATENT DOCUMENTS

CA 2956461 C * 8/2018

OTHER PUBLICATIONS

Vassily Reshetnikov (Spring assembly for slider mechanism, Published on May 2, 2013 at https://www.youtube.com/watch?v=t68g70CmVcA) (Year: 2013).*

* cited by examiner

*Primary Examiner* — Mahdi H Nejad
(74) *Attorney, Agent, or Firm* — Nutter McClennen & Fish LLP

(57) ABSTRACT

The invention provides systems and devices for an easily replaceable bearing system for a gunner stand of a vehicle. The bearing system reduces vibration from the vehicle on the bearings, decreases wear and tear, and reduces audible rattling. The bearing system includes a shuttle having a backplate and protruding geometry. Biased members are removably attached to the protruding geometry and are configured to create tension on rails of a gunner stand, holding the bearing system within the rails.

14 Claims, 10 Drawing Sheets

REMOVABLE BEARING SYSTEM FOR A GUNNER STAND

CROSS REFERENCE TO RELATED APPLICATIONS

This application is a continuation of U.S. patent application Ser. No. 17/839,916, filed Jun. 14, 2022, the content of which is incorporated herein by reference in its entirety.

FIELD OF THE INVENTION

The claimed invention relates to removable bearing systems, and, more particularly, to removable bearing systems used in gunner stands of armored military vehicles so as to improve ease of repairs made in the field during operations.

BACKGROUND

Gunner stands, present in many armored vehicles, raise and lower from within the vehicle to allow a gunner shoot from a turret at the top of the vehicle. In order to raise and lower the stand, the top platform that the gunner stands on may be attached to a scissor lift. The scissor lift includes bearings that slide along rails, allowing the platform to raise and lower. Over time, the bearings can wear out from use and vibrations of the vehicle. The bearings need to be replaced in the field, as the sending the armored vehicle to a shop is not feasible during military operations. Therefore, the bearing system must be easily replaceable in the field. However, most bearing systems in the current art are difficult to replace due to being securely attached to the scissor lift and rails in order to withstand use and vibrations. Therefore, a need exists for a replaceable bearing system that can be easily disassembled and reassembled in the field during military operations while withstanding use and vibrations of the vehicle.

SUMMARY

Gunner stands, present in many armored vehicles, raise and lower from within the vehicle to allow a gunner shoot from a turret at the top of the vehicle. In order to raise and lower the stand, the top platform that the gunner stands on may be attached to a scissor lift. The scissor lift includes bearings that slide along rails, allowing the platform to raise and lower. Various embodiments of the invention provide improved bearing systems for gunner stands that withstand vibrations from an armored vehicle and reduce audible rattling. The improved bearing systems of the present invention may also be easily removable in the event that wear and tear necessitates replacement of the bearing systems. Embodiments of the present invention allow for a robust bearing system that is also easily replaceable in the field so as not to disrupt military or law enforcement operations.

An embodiment of the gunner stand of the present invention may include two platforms, a base platform attached to the floor of a vehicle, and a top platform for a gunner to stand on. The platforms may be connected by a scissor lift that is capable of raising and lowering the top platform, so as to raise and lower the gunner from the turret of the vehicle.

An embodiment of the present invention may include a bearing system for a scissor lift. The bearing system may include a sliding shuttle having x, y, and z coordinate planes. In an embodiment of the invention, the shuttle may be made of bronze. The shuttle may have a backplate and a geometry protruding from the backplate in the z-direction. The area of the protruding geometry in the x-y plane may be less than that of the backplate.

The bearing system of an exemplary embodiment of the present invention may also include two biased members, such as, but not limited to, leaf springs. The first biased member and the second biased member may have geometries complimentary to the top and bottom of the shuttle respectively. The biased members may be removably attached to the shuttle at each end of the biased member. In an exemplary embodiment, the biased members are attached to the shuttle with screws. For example, the biased members may be attached to the shuttle by Chicago screws, allowing for easy removal of the shuttle from the bearing system.

The biased members may be made of a high tensile strength material. The high tensile strength material allows the biased members to exert tension on the rails of the gunner stand, holding the bearing system in place while allowing it to slide within the rails. The tension in the biased members may be controlled by the geometry of the shuttle. For example, a shuttle geometry including angles greater than 90° may increase the tension in the biased members and on the rails.

An embodiment of the invention may include a platform for a turret system for a vehicle. The platform includes a first base platform that is mounted to a floor of an interior of a vehicle. A second base platform is mounted above the first base platform connected by a scissor lift. The scissor lift may include a plurality of bearing systems, each having a shuttle and biased members. The bearing systems may be held within rails attached to the base platforms. The rails may be made of aluminum in an embodiment of the invention.

An exemplary bearing system may include a shuttle having x, y, and z coordinate planes. The shuttle may include a backplate and a geometry protruding from the backplate in the z-direction. The area of the protruding geometry in the x-y plane may be less than that of the backplate. The bearing system may also include a first and second biased member, each having a geometry complimentary to the top and bottom of the shuttle respectively. The first biased member is removably attached to the top of the protruding geometry and the second biased member is removably attached to the bottom of the protruding geometry. The biased members may be attached to the protruding geometry at each end of the biased member.

The geometry of the biased members may be complimentary to that of the top and bottom of the protruding geometry. By adjusting the shape of the protruding geometry, the tension of the biased members may be adjusted. For example, include angles greater than 90° in the protruding geometry may increase the tension of the biased members on the rails.

The biased members may be attached to the protruding geometry by screws. In some embodiments, the screws are Chicago screws.

BRIEF DESCRIPTION OF THE DRAWINGS

Features and advantages of the claimed subject matter will be apparent from the following detailed description of embodiments consistent therewith, which description should be considered with reference to the accompanying drawings.

DETAILED DESCRIPTION

Exemplary embodiments provide for a gunner stand that comprises an easily replaceable bearing system for use in the field that also reduces vibration from the vehicle on the bearings, decreasing wear and tear, and reducing audible rattling. Gunner stands, present in many armored vehicles, raise and lower from within the vehicle to allow a gunner shoot from a turret at the top of the vehicle. In order to raise and lower the stand, the top platform that the gunner stands on may be attached to a scissor lift. The scissor lift includes bearings that slide along rails, allowing the platform to raise and lower. Over time, the bearings can wear out from use and vibrations of the vehicle. The bearings need to be replaced in the field, as the sending the armored vehicle to a shop is not feasible during military operations. Therefore, the bearing system must be easily replaceable in the field and also withstand vibrations from the vehicle.

In general, a gunner stand comprises a top platform and a bottom platform. The bottom platform may be secured to the floor of an interior of a vehicle. The top platform is connected to the bottom platform by a scissor lift comprising a replaceable bearing system. The bearing system comprises a sliding shuttle having a backplate and a protruding area. The protruding area may have a hexagonal geometry, but is not limited to a hexagonal geometry. The bearing system also comprises biased members, including but not limited to leaf springs made of bearing material, the geometry of which complement the geometry of the shuttle. The geometry of the shuttle may be adjustable to allow for adjustment of the tension in the biased members. The biased members are removably attached to the shuttle. In some embodiments the biased members are attached using screws and/or rivets. This allows for easy removal of the bearing system from the gunner stand for easy replacement in the field.

Figure 1:
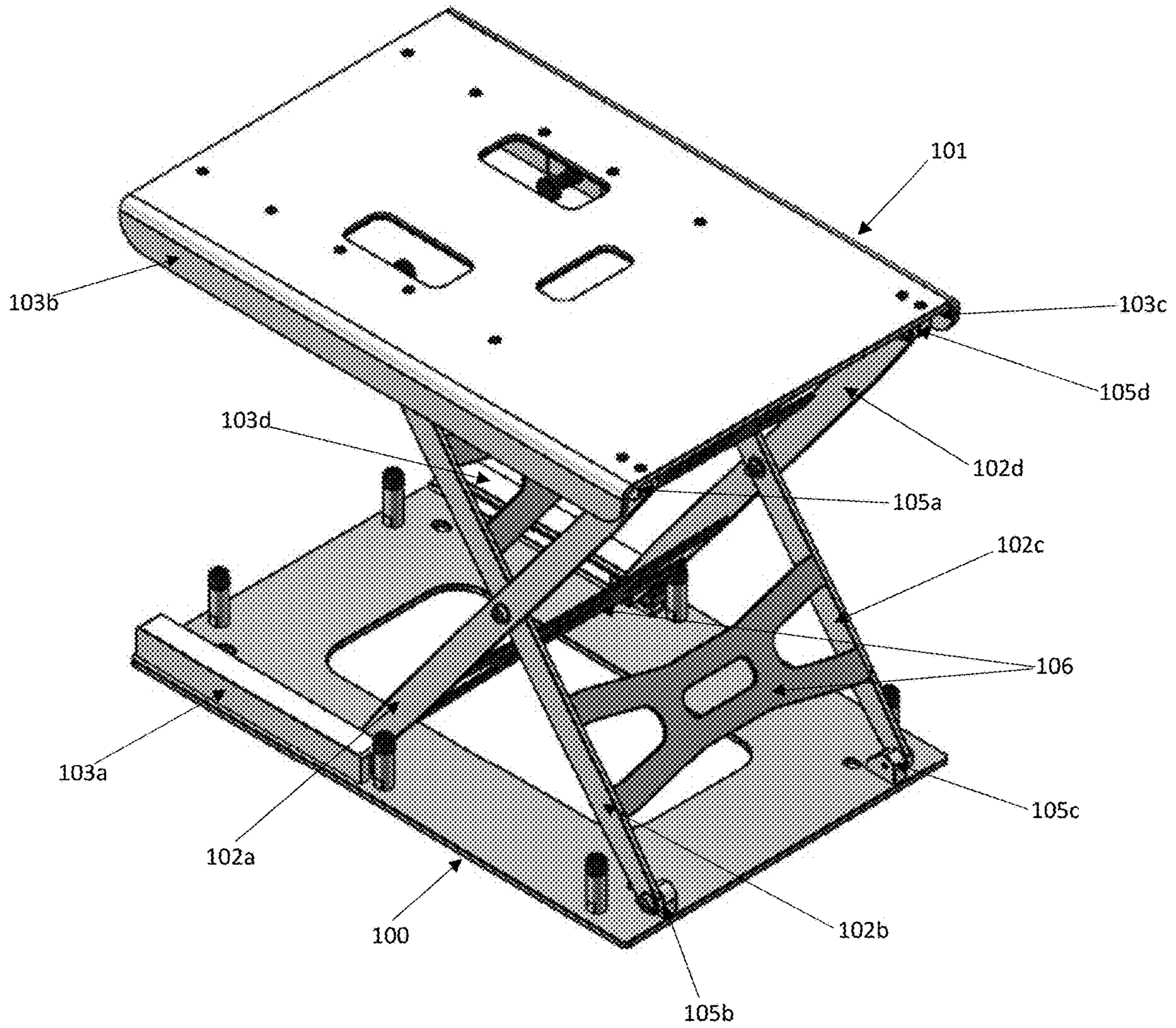
FIG. 1 depicts a gunner stand, comprising a platform, scissor lift, and rails with bearings for raising and lowering the stand.

An exemplary gunner stand is depicted in FIG. 1. An embodiment of the gunner stand includes two platforms; a bottom platform (100) attached to the floor of a vehicle, and a top platform (101) for a gunner to stand on. The two platforms (100, 101) are connected by a scissor lift comprising four scissor lift legs (102*a*-102*d*), wherein the scissor lift is capable of raising and lowering the top platform (101). The scissor lift comprises four rails (103*a*-103*d*), two on each platform (100, 101) parallel to each other. The scissor lift may comprise four legs (102*a*-102*d*), wherein each leg is attached to a bearing system (104) in the rails (103*a*-103*d*) on one end and attached to the platforms (100, 101) at the other end by a hinge (105*a*-105*d*). The ends of the legs (102*a*-102*d*) attached to the rails (103*a*-103*d*) may slide back and forth by way of the bearing system (104), allowing the top platform (101) to raise and lower. In some embodiments, the rails (103*a*-103*d*) may be made of aluminum, but may be made of steel, bronze, or other metals and alloys. The scissor lift legs (102*a*-102*d*) may also include supports (106) to stabilize the legs (102*a*-102*d*) in place.

Figure 2:
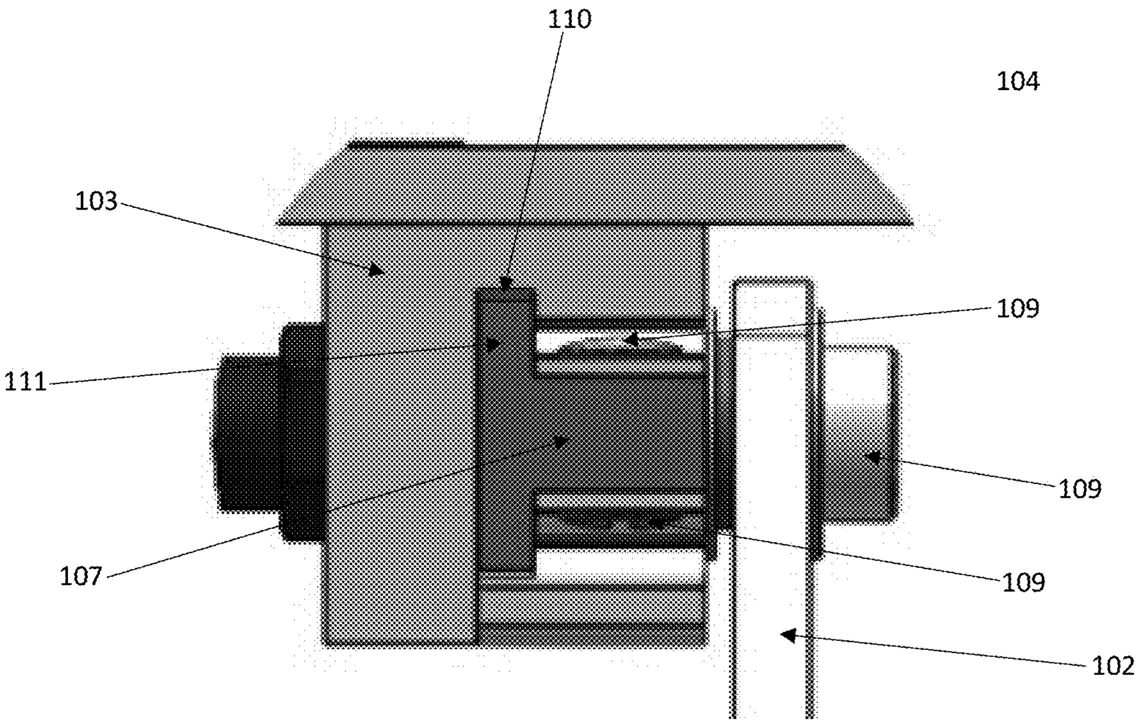
FIG. 2 depicts a front view of a bearing system, including a side view of a shuttle and biased members, along with the connection to a scissor lift.

A front view of an embodiment of a bearing system (104) is depicted in FIG. 2. The bearing system (104) depicted in FIG. 2 is loaded into a top rail (103), with a leg of the scissor lift (102) extending downward. As seen FIG. 2, a leg (102) of the scissor lift is attached to the front of the sliding shuttle (107). The sliding shuttle (107) is attached to biased members (108*a*, 108*b*), including but not limited to leaf springs, attached to the top and bottom of the shuttle (107). The bearing system (104), including the shuttle (107) and biased members (108*a*, 108*b*), is loaded into the rail (103) by sliding the bearing system (104) in at one end of the rail (103). The bearing system (104) is capable of sliding back and forth along the rail (103), allowing the scissor lift to raise and lower the top platform (101). As can be seen in FIG. 2, the rail (103) may have a notch (110) which allows for securement of the shuttle's (107) backplate (111) in the rail (103) as it slides back and forth along the rail (103). The biased members (108*a*, 108*b*) and scissor lift leg (102) may be attached to the shuttle (107) using screws, for example Chicago screws (109), which allow for easy removal of the bearing system (104) components in the field.

Figure 3:
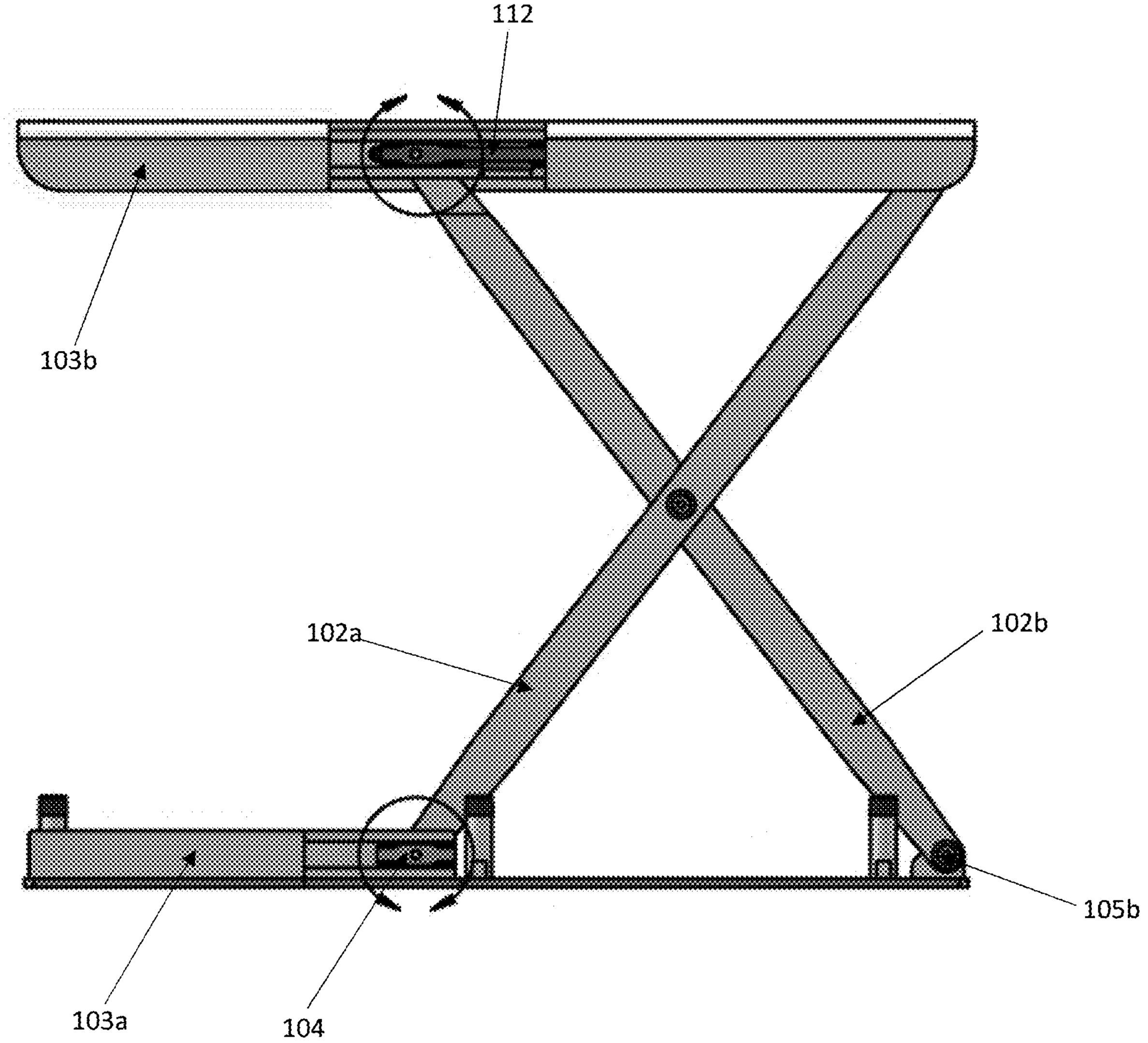
FIG. 3 depicts a side view of a gunner stand, with cutaway views of bearing systems including the shuttles and biased members.

FIG. 3 depicts a side view of an exemplary gunner stand, including cutaway views of the top bearing system (112) and bottom bearing system (104). In an embodiment, a gunner stand comprises a top platform (101) and a bottom platform (100) connected by a scissor lift. As seen in FIG. 3, the legs (102*a*, 102*b*) of the scissor lift are connected to the platforms (100, 101) by a hinge (105*b*) on one side, and to a bearing system (104) in the rails (103*a*, 103*b*) on the other side. In some embodiments, the top bearing system is a double bearing system (112), wherein the shuttle (107) has two protruding sections (113) and four biased members (108*a*, 108*b*). Each protruding section (113) has a biased member (108*a*) on the top portion and a biased member (108*b*) on the bottom portion, each complimenting the geometry of the protruding section (113). The top bearing may be a double bearing system (112) in order to better withstand vibrations and stress on the platform (101) from the weight of a gunner, as well as have holes or slots for locking pin positions to lock the exemplary gunner stand in upper and lower positions. In some embodiments, the bottom platform (100) only needs a single bearing system (104). The bearings (104) are loaded into the rails (103*a*-103*d*) such that the biased members (108*a*, 108*b*) are under tension in the rails (103*a*-103*d*) and press against the top and bottom of the rails (103*a*-103*d*). The tension keeps the bearings (104) within the rails (103*a*-103*d*) as they slide back and forth as the top platform (101) is raised and lowered. The biased members (108*a*, 108*b*) may be attached to the shuttle (104) with screws (109), for example Chicago screws or rivets in some embodiments, which allows for easy replacement in the field.

Figure 4:
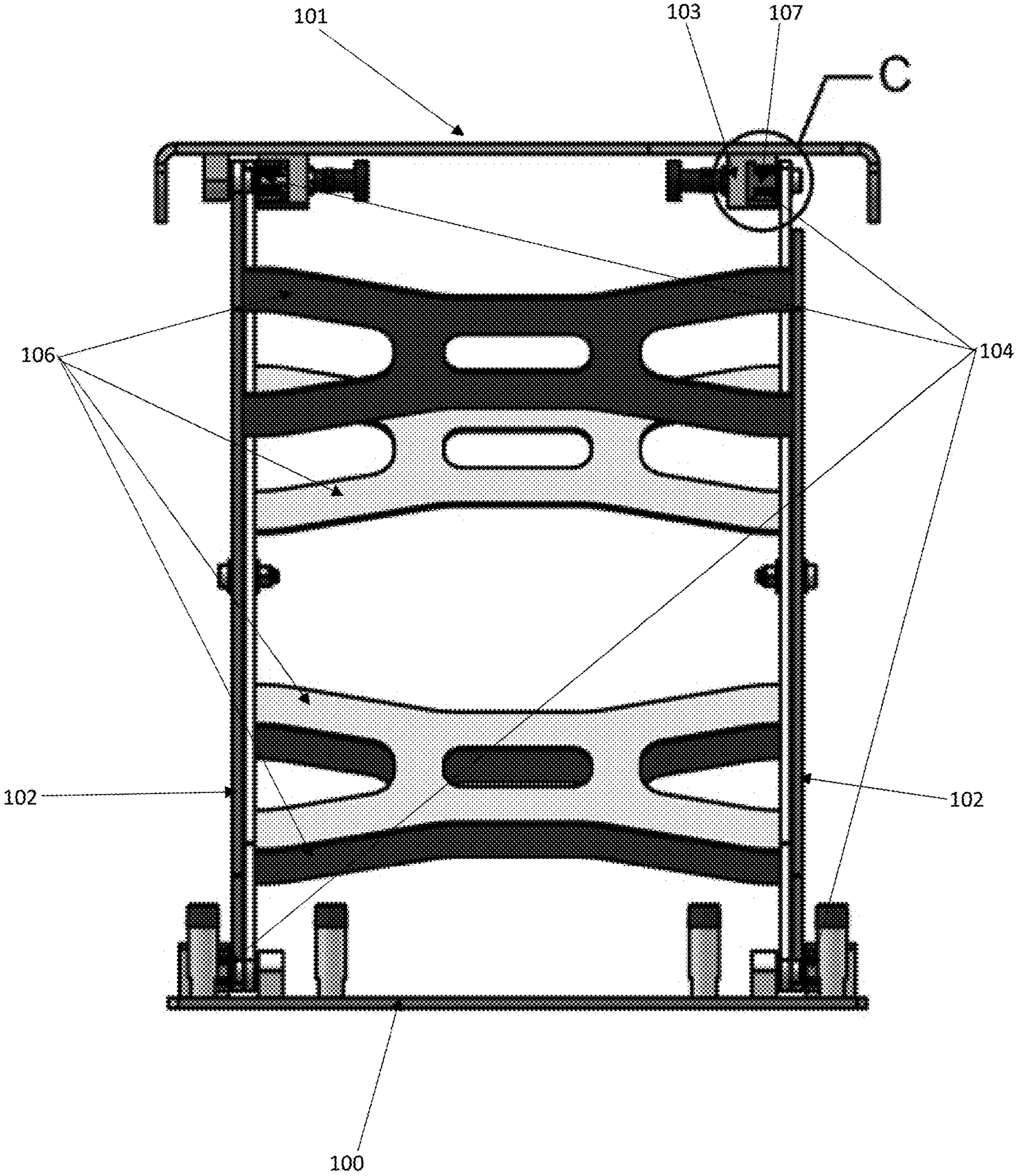
FIG. 4 depicts a front view of a gunner stand with cutaway views of bearing systems with shuttles and connections to the scissor lift.

A front view of an exemplary gunner stand is depicted in FIG. 4. The top platform (101) and bottom platform (100) are connected by scissor lift legs (102). The scissor lift legs (102) may comprise support struts (106) connecting adjacent legs (103) for further stability and structural support of the gunner stand. The bottom platform (100) may be attached to the floor of a vehicle while the top platform (101) may be raised and lowered to accommodate a gunner. The scissor lift legs (102) are attached to the platforms (100, 101) by hinges (105) on one end, and to rails (103) on the other. An exemplary gunner stand has four rails (103*a*-103*d*) and four scissor lift legs (102*a*-102*d*). The scissor lift legs (102) are attached to the rails (103) by a bearing system (104). The bearing system (104) may comprise a shuttle (107) having a backplate (111) and a protruding section (113). The backplate (111) of the shuttle (107) may fit into a notch (110) on the rail (103) in order to secure it within the rail (103). The top and bottom of the protruding section (113) of the shuttle (107) may have leaf springs or other biased members (108*a*, 108*b*) attached. The biased members (108*a*, 108*b*) are attached to the shuttle (107) under tension, and when loaded into the rails (103) exert force on the rails (103), keeping the bearing system (104) within the rails (103). The biased members (108*a*, 108*b*) and scissor lift legs (103*a*-103*d*) may be attached to the shuttle (107) with screws (109), allowing for easy removal in the field in the event of damage to the bearing system.

Figure 5:
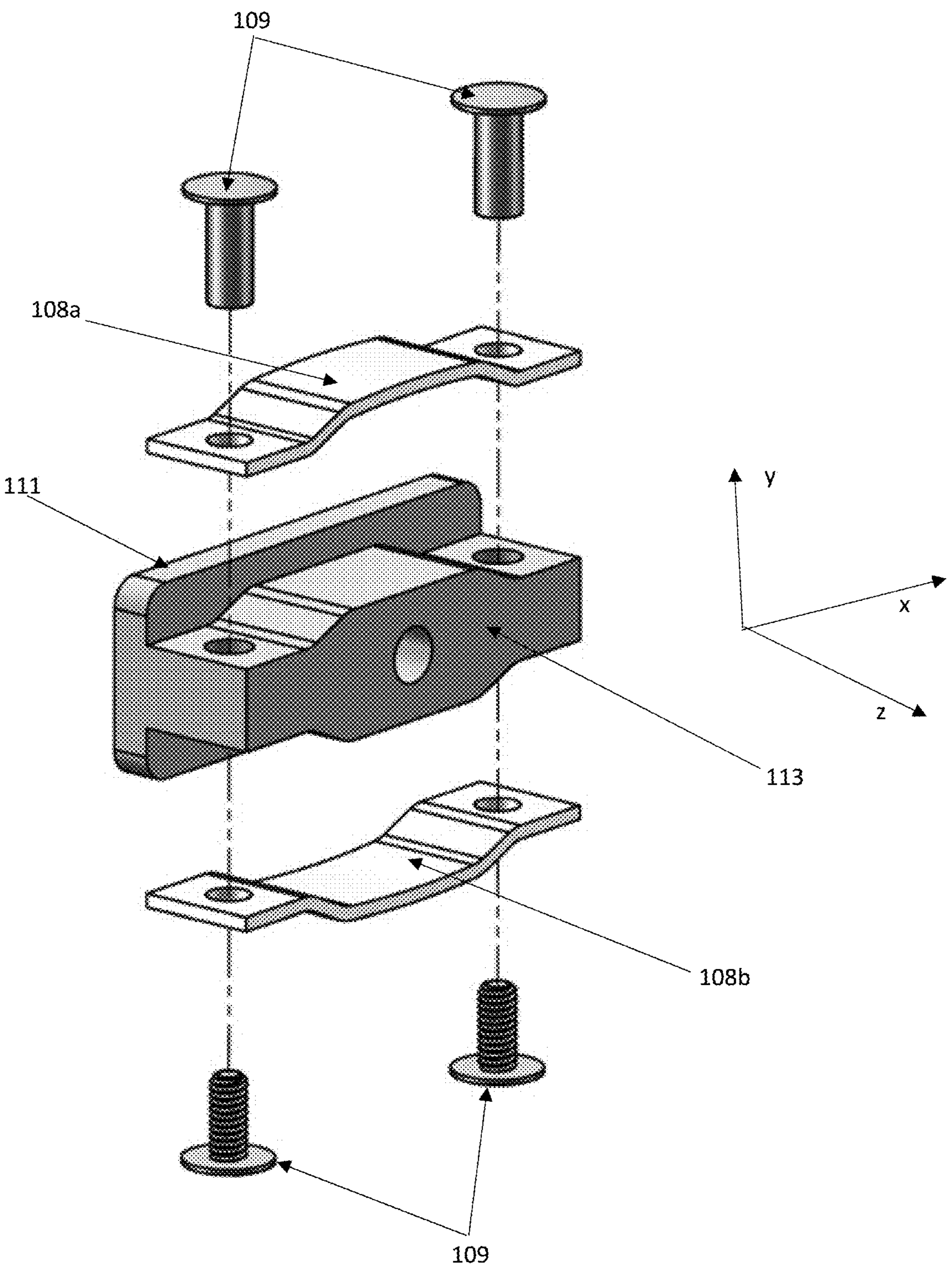
FIG. 5 depicts an exploded view of a bearing system including a shuttle, biased members, and Chicago screws.

An exploded view of an exemplary replaceable bearing system (104) is depicted in FIG. 5. The bearing system (104) of the present invention is easily replaceable in the event of wear and tear or other damage in the field. A shuttle (107) comprises a backplate (111) and protruding geometry (113) in the z plane. The protruding geometry (113) may be hexagonal in shape, or a polygonal shape. The geometry of the protrusion (113) in the x-y plane may include angles greater than 90° to create an oblong polygonal shape. In some embodiments, the protruding geometry (113) has a smaller area in the x-y plane than the area of the backplate (111). In some embodiments, the shuttle (107) is made of bronze that may be impregnated with oil so that no additional lubricant is needed for the shuttle (107) to slide in the rails (103). A top biased member (108*a*) and a bottom biased member (108*b*) are attached to the protruding geometry (113) of the shuttle (107) under tension. In some embodiments, the biased members (108*a*, 108*b*) are leaf springs. The biased members (108*a*, 108*b*) may be made of a high tensile strength material. In some embodiments, the biased members (108*a*, 108*b*) are attached using screws and/or rivets. The biased members (108*a*, 108*b*) may be attached to the shuttle using screws (109), such as Chicago screws or rivets, for easy removal. The use of screws allows for easy disassembly and reassembly of the bearing system in the field in the event of damage.

Figure 6:
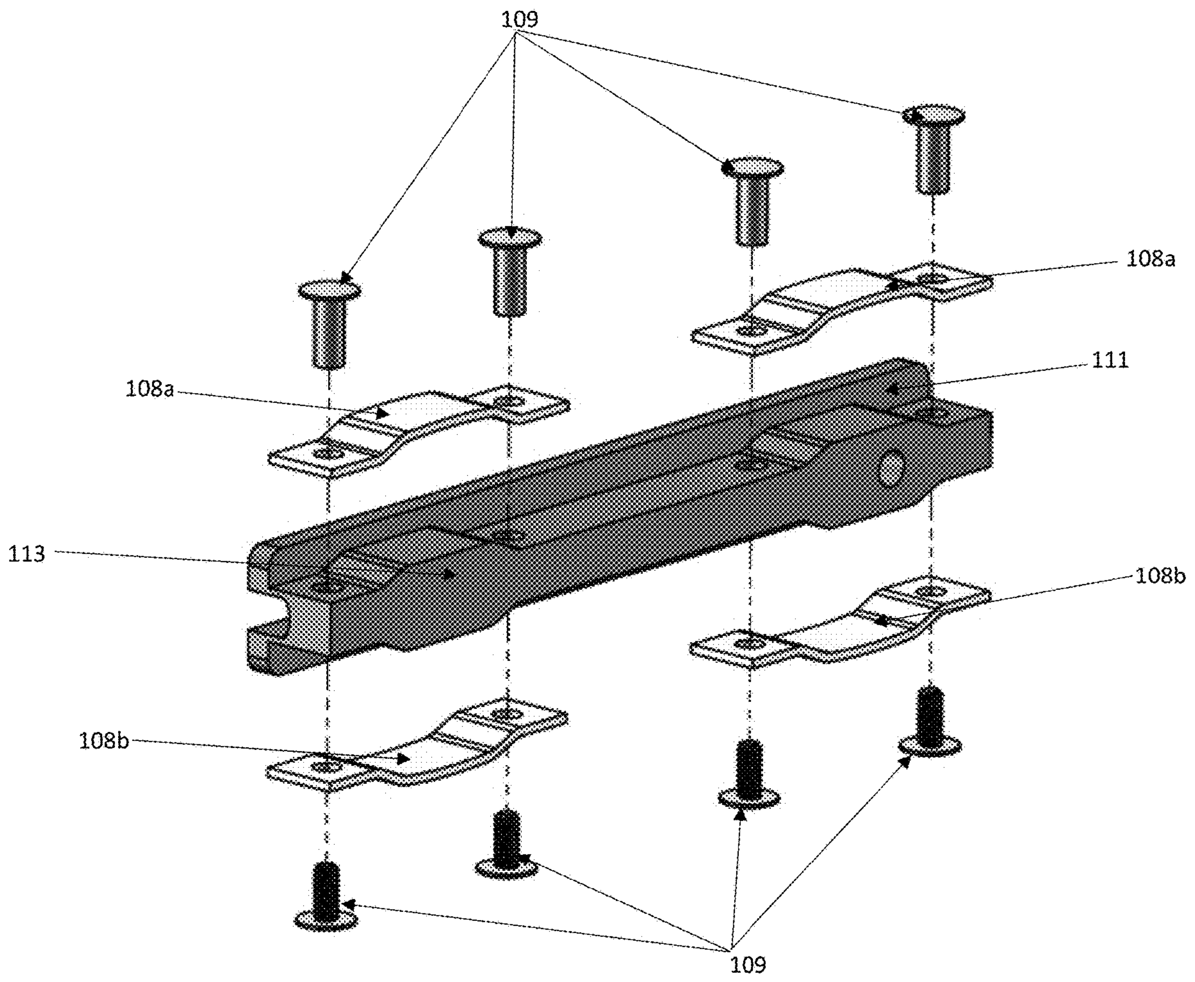
FIG. 6 depicts and exploded view of a double bearing system including a shuttle, biased members, and Chicago screws.

An exploded view of an exemplary double bearing system (112) is depicted in FIG. 6. A double bearing system (112) could be used in the upper rails (103*b*, 103*c*) in order to provide increased structural support to withstand vibrations and the load of a gunner. A double bearing system (112) may also have holes or slots for locking pins to lock the position of the exemplary gunner stand in several raised or lowered positions. A double bearing system (112) may also be used in the lower rails (103*a*, 103*d*). In some embodiments, a double bearing system (112) comprises a backplate (111) capable of being secured in a rail (103). The backplate (111) may have one protruding area (113) comprising two hexagonal areas. The backplate (111) may also have two protruding areas. The geometry of the protruding area (113) may be any polygonal shape. Biased members (108*a*, 108*b*) may be attached to the top and bottom of the protruding sections (113). The shape of the biased members (108*a*, 108*b*) may be complementary to the geometry of the protruding sections (113). The biased members (108*a*, 108*b*) may be leaf springs in some embodiments. The biased members (108*a*, 108*b*) may be attached to the shuttle (107) under tension so as to exert a force on the rails (103). In some embodiments, the biased members (108*a*, 108*b*) are attached to the shuttle with Chicago screws (109). Note that in some embodiments a triple or greater bearing system (104) is possible.

Figure 7:
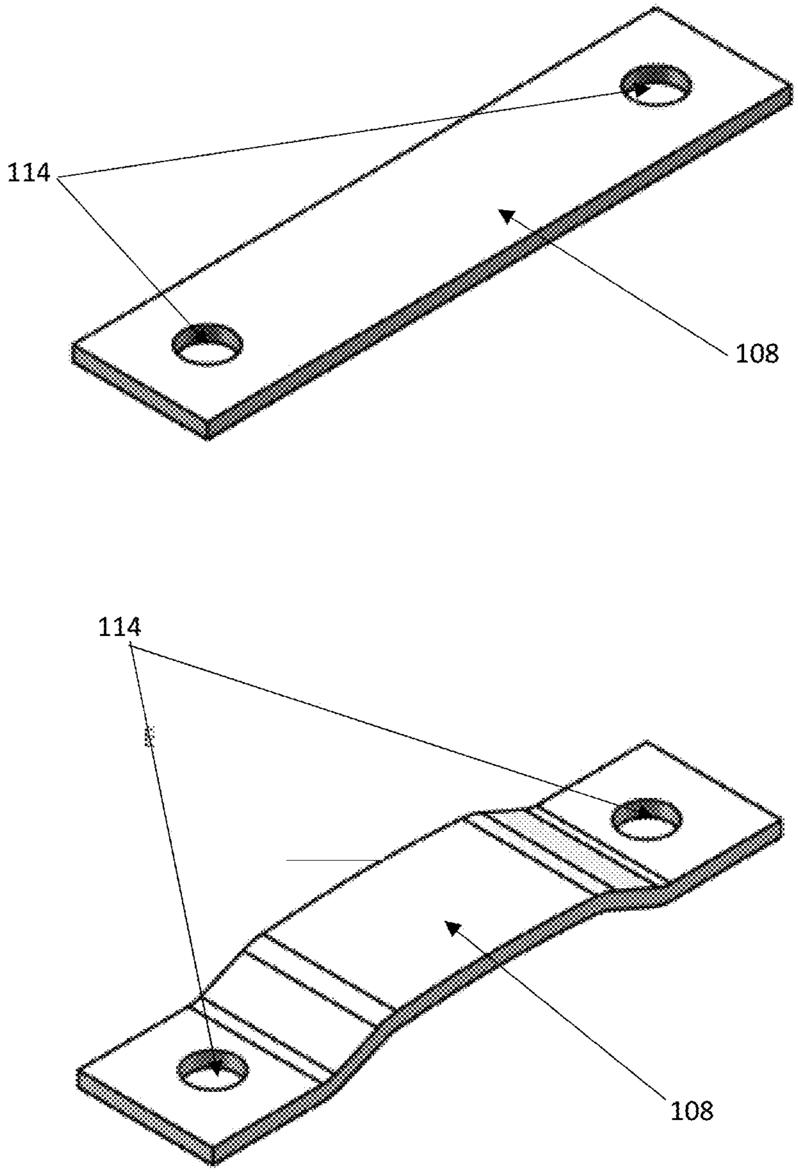
FIG. 7 depicts a biased member as machined (top figure) and as formed into a biased shape (bottom figure).

A biased member (108) as machined and as formed is depicted in FIG. 7. As machined, a biased member (108) or leaf spring may be a rectangle and may be made of a high tensile strength material. Other polygonal shapes are possible for the biased member (108). The biased member (108) may have rounded corners and/or sharp corners, and linear edges and/or curved edges. As machined, the biased member (108) may be flat. In order to be attached to the shuttle under tension, the biased member (108) may be formed into a biased or sloped configuration. The biased member (108) may have one or more linear slopes and/or a continuous curve. The biased member (108) may include holes (114) for attaching the biased member (108) to the shuttle (107) with screws or other fasteners. The biased member (108) may be coated in ultra high molecular weight polyethylene, or other low friction polymer coating, in order to facilitate sliding in the rails (103). The biased member may also be made of ultra high molecular weight polyethylene.

Figure 8:
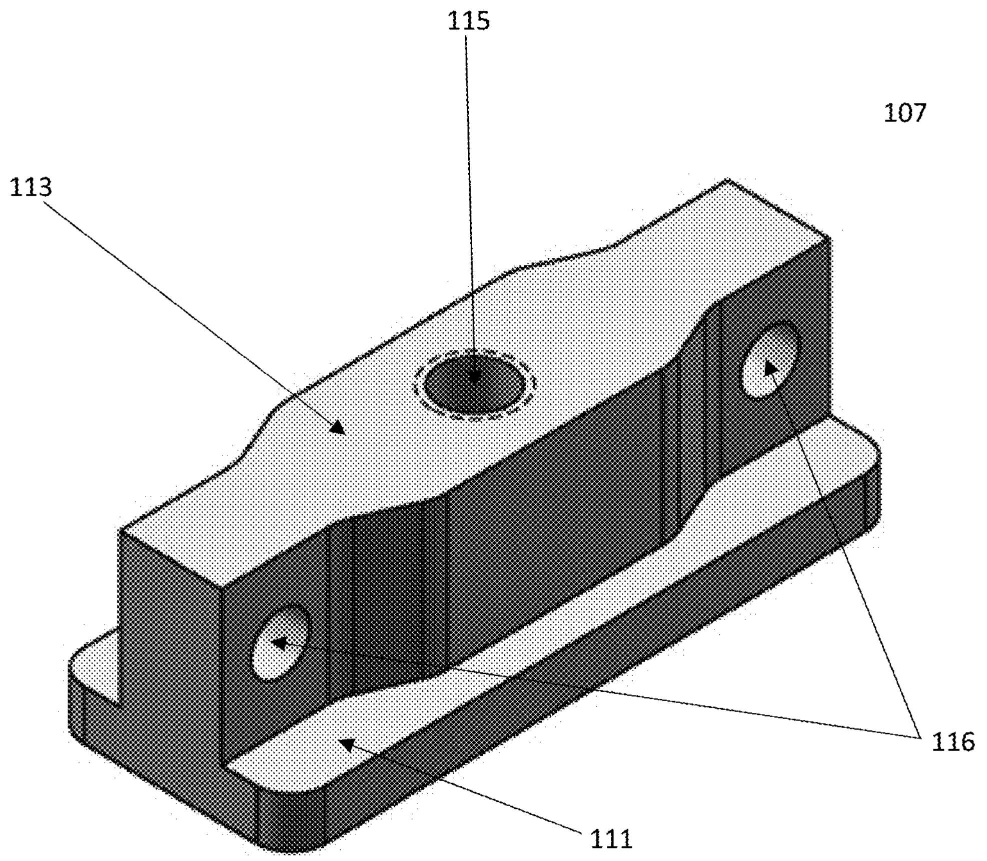
FIG. 8 depicts a top view of a shuttle. The shuttle has a geometry to match biased members.

An exemplary shuttle (107) is depicted in FIG. 8. In some embodiments the shuttle (107) is made of bronze, though the shuttle (107) may be made of any material. The shuttle (107) may comprise a back plate (111) capable of sliding into a notch (110) on the rails (103) in order to secure the shuttle (107) on the rails (103). The shuttle (107) may have a protruding geometry (113) in a shape that compliments that of the biased members (108*a*, 108*b*). The shuttle (107) may be hexagonal in shape or another polygonal shape. The shuttle (107) may comprise holes (116) on each end extending through the top to the bottom for securing the biased members (108*a*, 108*b*). The shuttle (107) may comprise a hole (115) on its face for securing a scissor lift leg (102). The shuttle (107) is easily removeable from the scissor lift leg (102) to allow for easy disassembly and reassembly in the field.

Figure 9:
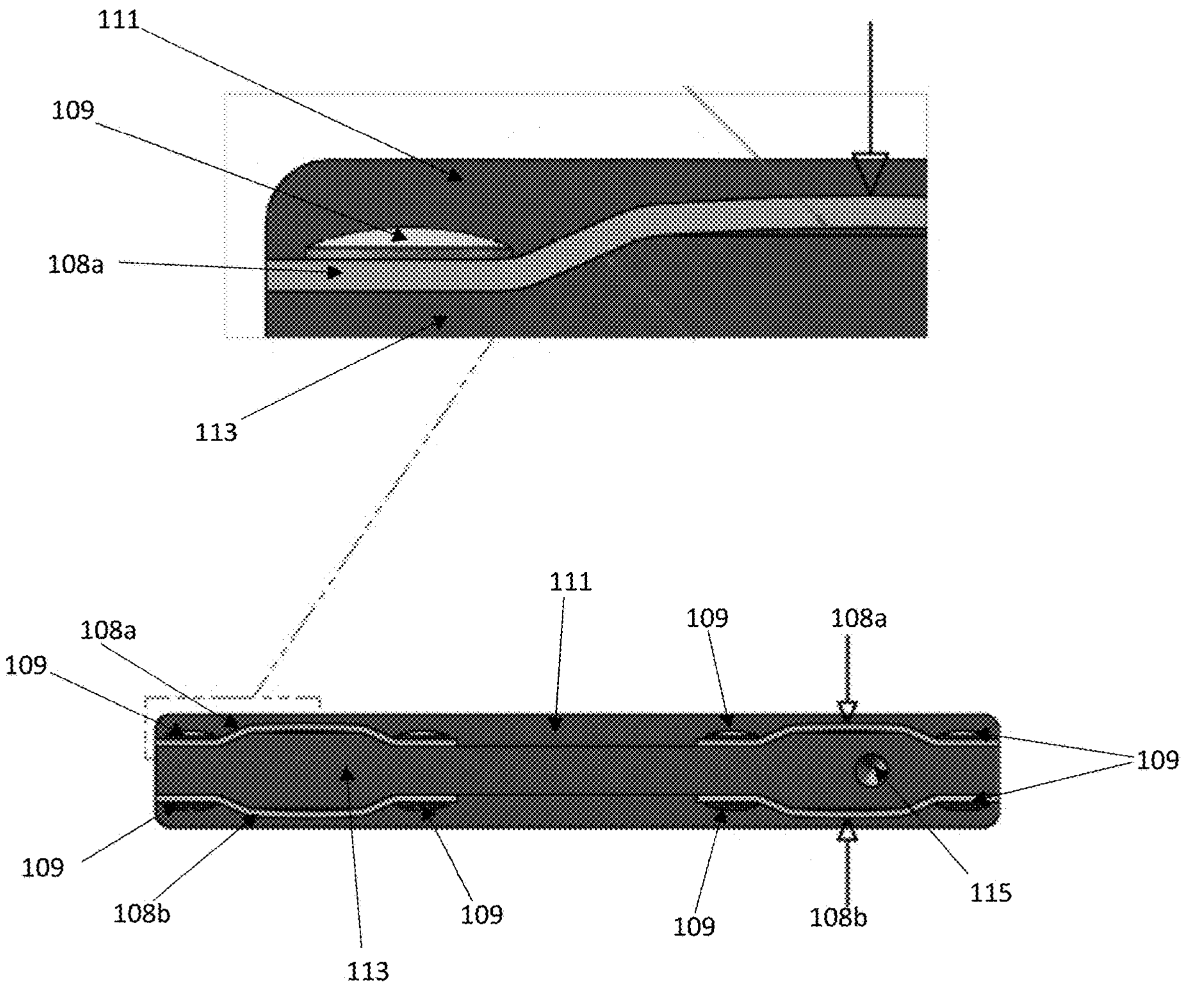
FIG. 9 depicts a side view of a biased member geometry in relation to a shuttle.

An example of the biased member (108*a*) attached to the shuttle (107) is depicted in FIG. 9. The biased members (108*a*, 108*b*) create tension on the rails (103), keeping the bearing system (104) in place within the rails (103). The biased member (108*a*) is attached to the shuttle (107) at two or more ends of the shuttle (107). In some embodiments, the biased member (108*a*) is attached to the shuttle (107) for example with screws (109), for example Chicago screws, or rivets or the like. The protruding geometry of the shuttle (113) is complementary to that of the biased member (108*a*) such that the geometry of the shuttle (107) forces the biased member (108*a*) to bow out, creating tension on the rails (103). In some embodiments, the biased members (108*a*, 108*b*) are leaf springs, but may be any high tensile strength material. The protruding geometry (113) of the shuttle (107) may be adjusted in order to adjust the tension in the biased members.

Figure 10:
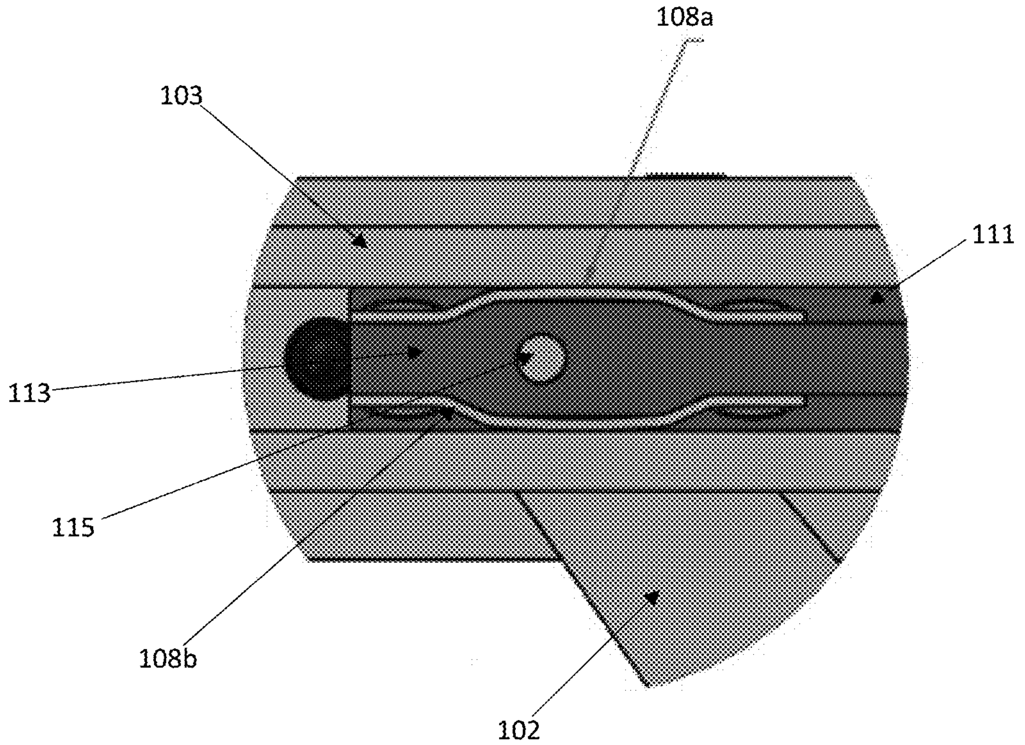
FIG. 10 depicts a side view of a shuttle and biased members as loaded into a rail.

A cutaway side view of a bearing system (104) and rail (103) is depicted in FIG. 10. A shuttle (107) may be attached to two biased members (108*a*, 108*b*) and loaded into a rail (103) attached to one of the platforms (100, 101) of the gunner stand. The biased members (108*a*, 108*b*) are attached under tension so as to bow out away from the protruding geometry (113) of the shuttle (107) and exert force on the rails (103), keeping the bearing (104) in place as it slides back and forth on the rail (103). In some embodiments, the biased members (108*a*, 108*b*) are attached using Chicago screws (109) in order to be easily removed and replaced.

INCORPORATION BY REFERENCE

References and citations to other documents, such as patents, patent applications, patent publications, journals, books, papers, web contents, have been made throughout this disclosure. All such documents are hereby incorporated by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is this indicated by the appended claims rather than by the foregoing description, and all changes which come within the meaning and range of equivalency of the claims are therefore intended to be embraced therein.

What is claimed is:

1. A bearing system for a scissor lift, the system comprising:
- a sliding shuttle having x, y, and z coordinate planes, wherein the shuttle has a backplate, and
  - the shuttle has a geometry protruding from the backplate in the z-direction, an area of the protruding geometry in the x-y plane being less than that of the backplate;
- a first biased member having geometry complimentary to a top of the protruding geometry,
- a second biased member having geometry complimentary to a bottom of the protruding geometry,
  - wherein:
  - the first biased member is removably attached to the top of the protruding geometry at a first end and a second end;
  - the second biased member is removably attached to the bottom of the protruding geometry at a first end and a second end; and
  - the protruding geometry comprises angles greater than 90°.

2. The system as described in claim 1, wherein the first and the second biased members are removably attached to the protruding geometry by screws.

3. The system as described in claim 2, wherein the screws are Chicago screws.

4. The system as described in claim 1, wherein the shuttle is made of bronze.

5. The system as described in claim 1, wherein the first and the second biased members are leaf springs.

6. The system as described in claim 1, wherein the first and the second biased members are made of a high tensile strength material.

7. A platform for a turret system for a vehicle, the platform comprising:
- a first base platform and a second base platform, each base platform having a distal end and a proximal end,
- the first base platform being mounted to a floor of an interior of a vehicle, the second base platform being mounted above and parallel to the first base platform, the second base platform being connected to the first base platform by a scissor lift, the scissor lift comprising:
- a bearing system comprising:
  - a sliding shuttle having x, y, and z coordinate planes, wherein:
    - the shuttle has a backplate;
    - the shuttle has a geometry protruding from the backplate in the z-direction;
    - an area of the protruding geometry in the x-y plane being less than that of the backplate; and
    - the protruding geometry comprises angles greater than 90°;
  - a first biased member having geometry complimentary to a top of the protruding geometry;
  - a second biased member having geometry complimentary to a bottom of the protruding geometry, wherein:
    - the first biased member is removably attached to the top of the protruding geometry at a first end and a second end; and
    - the second biased member is removably attached to the bottom of the protruding geometry at a first end and a second end; and
- a plurality of rails attached to the distal corners of the base platforms, each rail capable of receiving the bearing system.

8. The platform as described in claim 7, wherein the first and the second biased members are made of a high tensile strength material.

9. The platform as described in claim 7, wherein the first and the second biased members are ultra high molecular weight polyethylene leaf springs.

10. The platform as described in claim 7, wherein the shuttle is made of bronze.

11. The platform as described in claim 7, wherein the rails are made of aluminum.

12. The system as described in claim 7, wherein the first and the second biased members are removably attached to the protruding geometry by screws.

13. The system as described in claim 12, wherein the screws are Chicago screws.

14. The system as described in claim 7, wherein the first and the second biased members are removably attached to the protruding geometry so as to create tension on the first and the second biased members; and wherein the first and the second biased members create tension inside the rails.

* * * * *